(12) United States Patent
Yamane

(10) Patent No.: US 6,212,972 B1
(45) Date of Patent: Apr. 10, 2001

(54) GRIP FOR A BICYCLE SHIFT CONTROL DEVICE

(75) Inventor: Takuro Yamane, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/599,291

(22) Filed: Jun. 21, 2000

Related U.S. Application Data

(62) Division of application No. 08/900,935, filed on Jul. 25, 1997, now Pat. No. 6,101,895.

(51) Int. Cl.[7] .............................. B62K 21/26; B62K 23/04
(52) U.S. Cl. ........................ 74/551.9; 74/489; 16/116 R
(58) Field of Search .................................. 74/551.9, 489, 74/488, 543; 16/116 R, DIG. 12; 81/177.1, 177.6; D8/303, DIG. 7, DIG. 8

(56) References Cited

U.S. PATENT DOCUMENTS

| | | | |
|---|---|---|---|
| 2,222,121 | 11/1940 | Roberts | 74/551.9 |
| 3,189,069 | 6/1965 | Stowell | 145/61 |
| 3,344,684 | 10/1967 | Steere et al. | 74/551.9 |
| 3,633,437 | 1/1972 | Ishida | 74/489 |
| 4,768,406 | 9/1988 | Fitzwater | 81/177.1 |
| 4,900,291 | 2/1990 | Patterson | 474/80 |
| 4,969,231 | 11/1990 | Mader et al. | 16/141 R |
| 4,972,733 | 11/1990 | Olmr et al. | 74/551.9 |
| 5,197,927 | 3/1993 | Patterson et al. | 474/80 |
| 5,355,552 | 10/1994 | Huang | 16/111 R |
| 5,564,316 | 10/1996 | Larson et al. | 74/551.9 |
| 5,584,213 | 12/1996 | Larson et al. | 74/551.9 |

FOREIGN PATENT DOCUMENTS

| | | |
|---|---|---|
| 759393 A1 | 2/1997 | (EP) . |
| 44-26571 | 11/1969 | (JP) . |
| 55-142142 | 11/1980 | (JP) . |
| 55-142143 | 11/1980 | (JP) . |
| 592659 | 2/1978 | (SU) . |

Primary Examiner—Mary Ann Green
(74) Attorney, Agent, or Firm—James A. Deland

(57) ABSTRACT

A rotatable handgrip for a twist-grip shift control device includes a rotatable member and a flexible grip disposed over the rotatable member. One or more spaces are defined between an inner peripheral surface of the grip and an outer peripheral surface of the rotatable member so that the grip bends radially inwardly in response to pressure from a hand part (palm, finger, thumb, etc.) so as to generally conform to the hand part. The space may be formed by a recess formed on the inner peripheral surface of the grip, on the outer peripheral surface of the rotatable member, a combination of recesses on the grip and the rotatable member, or through some other structure.

53 Claims, 5 Drawing Sheets

GRIP FOR A BICYCLE SHIFT CONTROL DEVICE

This application is a division of application Ser. No. 08/900,935, filed Jul. 25, 1997, now U.S. Pat. No. 6,101,895.

BACKGROUND OF THE INVENTION

The present invention is directed to bicycle shift control devices and, more particularly, to a grip for a twist-grip shift control device which conforms more closely to a rider's hand.

Twist-grip shift control devices are sometimes used to control various types of bicycle transmissions. Example such devices are disclosed in JP 44-26571; U.S. Pat. No. 3,633,437; U.S. Pat. No. 4,900,291 and U.S. Pat. No. 5,197,927. Such devices typically include a generally annular rotatable member that is mounted around the bicycle handlebar coaxially with the handlebar axis, wherein rotation of the rotatable member with the palm of the hand controls the pulling and releasing of the transmission control cable.

For reliable operation of twist-grip shift control devices, it is desirable to have adequate traction between the palm of the hand and the rotatable member. U.S. Pat. No. 5,564,316 and U.S. Pat. No. 5,584,213 discuss the use of nubs and elongated ribs on a flexible cover to increase the traction between the hand and the rotatable member. However, while such nubs and ribs may help improve traction, they also tend to jam into the rider's hand, thus creating pain and fatigue.

SUMMARY OF THE INVENTION

The present invention is directed to a rotatable member for a twist-grip shift control device wherein the grip portion of the rotatable member conforms closely to a rider's hand to increase traction between the palm of the hand and the rotatable member, but which significantly decreases the risk of pain and fatigue. In one embodiment of the present invention, a rotatable handgrip for a twist-grip shift control device includes a rotatable member and a flexible grip disposed over the rotatable member. One or more spaces are defined between an inner peripheral surface of the grip and an outer peripheral surface of the rotatable member so that the grip bends radially inwardly in response to pressure from a hand part (palm, finger, thumb, etc.) so as to generally conform to the hand part. The space may be formed by a recess formed on the inner peripheral surface of the grip, on the outer peripheral surface of the rotatable member, a combination of recesses on the grip and the rotatable member, or through some other means. A rotatable grip constructed according to the present invention increases traction between the palm of the hand and the rotatable grip without requiring ribs or nubs. However, the present invention also may be employed advantageously in a handgrip which uses ribs and nubs, because the space between the grip and the rotatable member allow the ribs and nubs to yield to the pressure of the rider's hand. This, in turn, reduces or eliminates the incidences of pain and fatigue.

DETAILED DESCRIPTION OF THE EMBODIMENTS

Figure 1:
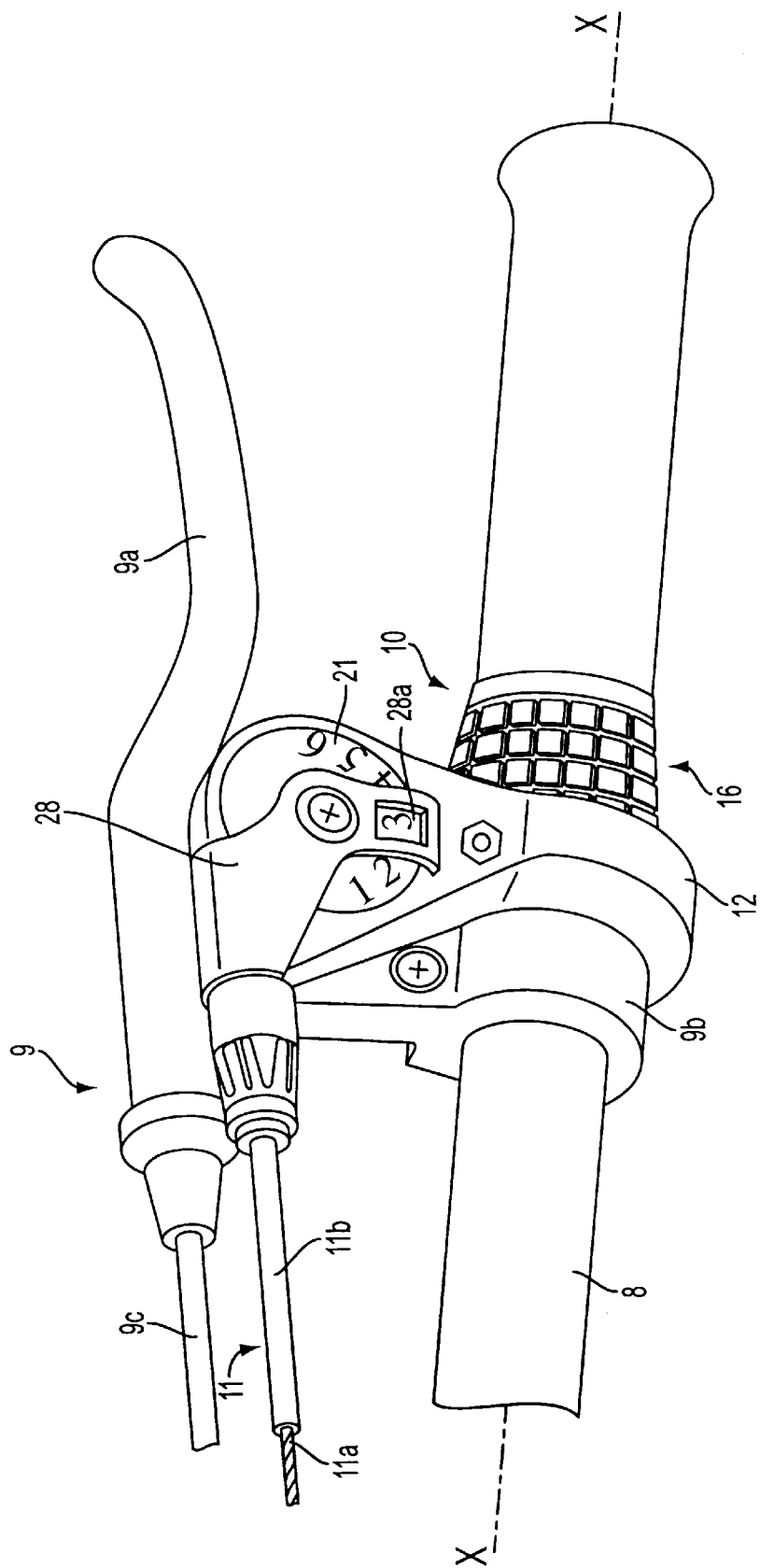
FIG. 1 is an oblique view of a particular embodiment of a bicycle twist-grip shift control device according to the present invention mounted together with a brake lever assembly.

FIG. 1 is an oblique view of a particular embodiment of a twist-grip shift control device 10 according to the present invention mounted together with a brake lever assembly 9. As shown in FIG. 1, shift control device 10 includes a housing 12 mounted around a handlebar 8, a rotatable handgrip 16 structured for rotation around an axis X coaxial with handlebar 8, a pulley 21 for pulling and releasing an inner wire 11a that slides within an outer casing 11b of control cable 11, and a pulley retaining member 28 for retaining pulley 21 to housing 12. Pulley retaining member 28 may include a framed opening 28a for selectively displaying a numeral disposed on pulley 21 indicating the currently selected gear. A motion transmitting mechanism (not shown) is disposed between rotatable handgrip 16 and pulley 21 for transmitting rotation of handgrip 16 to pulley 21. The motion transmitting mechanism may be constructed, for example, according U.S. Pat. No. 5,921,139 entitled "Bicycle Shift Control Device" by Takuro Yamane and incorporated herein by reference. Since the motion transmitting mechanism does not form a part of the present invention, a detailed description of that mechanism shall be omitted.

Brake lever assembly 9 includes a brake lever 9a pivotably mounted to a brake lever bracket 9b which, in turn, is mounted around handlebar 8 in close proximity to (e.g., adjacent) housing 12 of shift control device 10. Brake lever 9a is connected to a brake control cable 9c for controlling a brake device in a conventional manner.

Figure 2A:
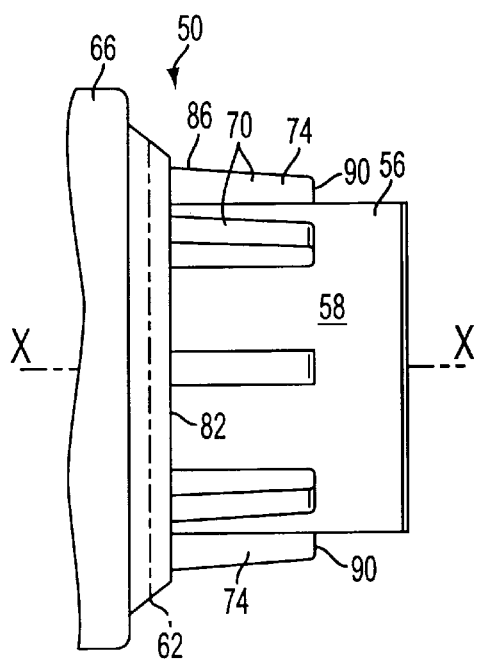
FIGS. 2A and 2B are front and side views, respectively, of a particular embodiment of a rotatable member according to the present invention used in the twist-grip shift control device of FIG. 1.
Figure 2B:
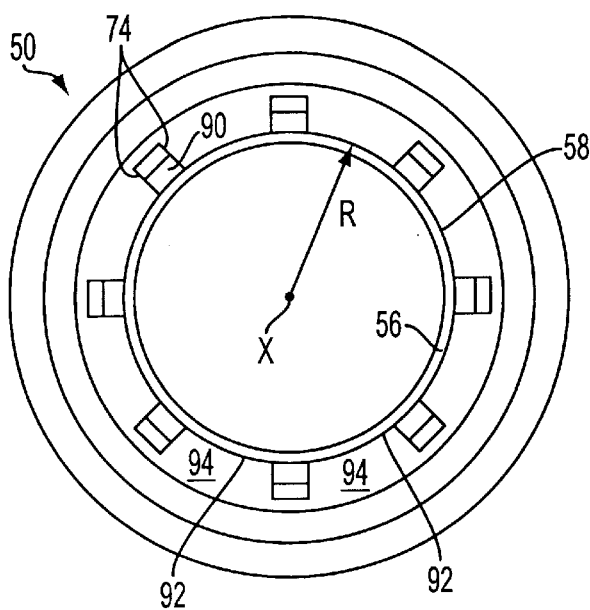

As shown in FIGS. 2A, 2B, 3A, 3B and 4, handgrip 16 includes a rotatable member 50 and a flexible grip 54. As shown in FIGS. 2A and 2B, rotatable member 50 includes a generally cylindrical main body 56 having an outer peripheral surface 58; a generally frustoconical intermediate portion 62, and a larger generally cylindrical portion 66 which interfaces with the motion transmitting mechanism within housing 12. A plurality of grip engaging members in the form of ribs 70 elongated in the direction of the handlebar axis X extend radially outwardly from outer peripheral surface 58 of main body 56. In this embodiment, ribs 70 are evenly spaced in the circumferential direction of outer peripheral surface 58. Each rib includes a pair of side surfaces 74 that extend from a side surface 82 of frustoconical portion 62 in the direction of the handlebar axis X, and a top surface 86 that inclines slightly radially inwardly from side surface 82 of frustoconical portion 62 to a rib end surface 90 located at an intermediate portion of outer peripheral surface 58. The plurality of ribs 70 define a corresponding plurality of valleys 94 disposed between each pair of adjacent ribs 70, where the bottom floor 92 of each valley 94 is formed by outer peripheral surface 58 of main body 56. In this embodiment, outer peripheral surface 58 has a constant radius of curvature R from handlebar axis X along its entire axial length so that outer peripheral surface 58 has the shape of a straight cylinder. As a result, the floor 92 of each valley 94 likewise has a constant radius of curvature as shown in FIG. 2B.

Figure 3A:
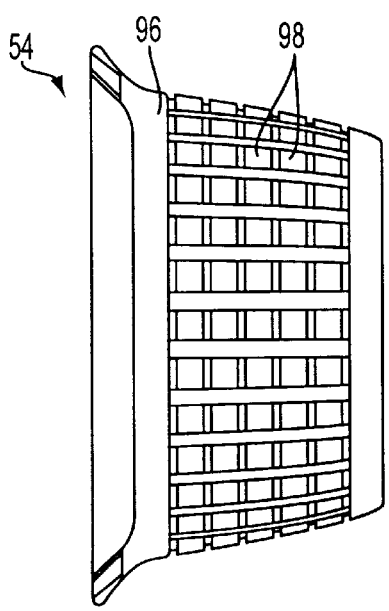
FIGS. 3A and 3B are front and side views, respectively, of a particular embodiment of a flexible grip according to the present invention that is used with the rotatable member shown in FIGS. 2A and 2B.
Figure 3B:
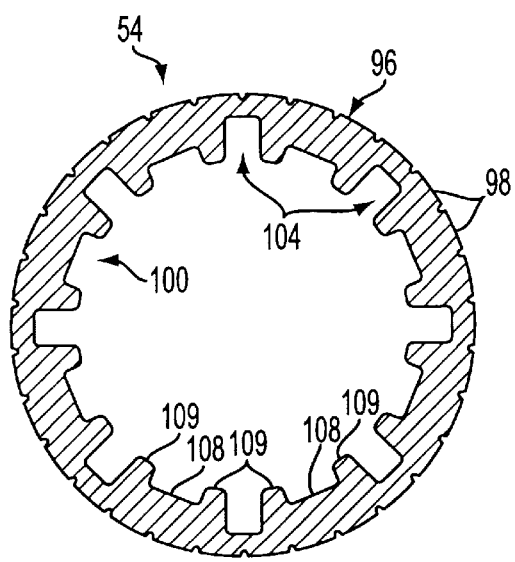
Figure 4:
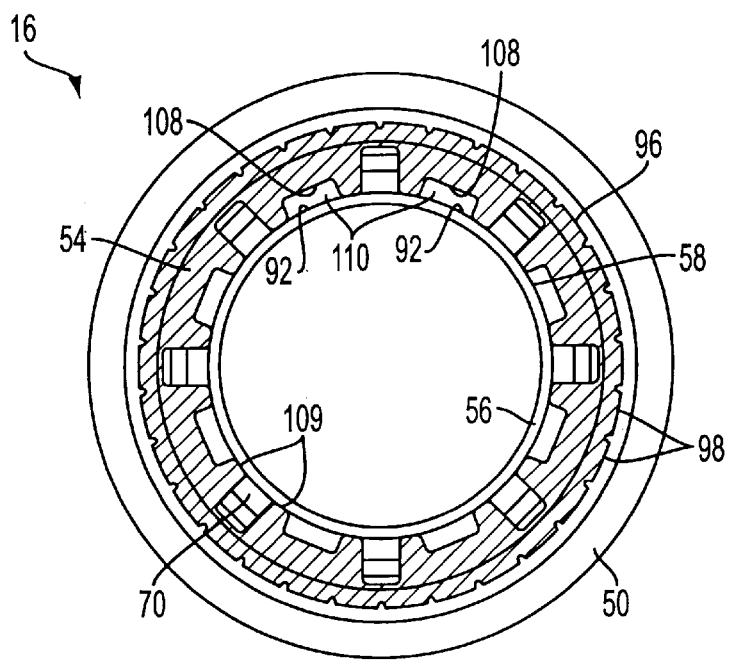
FIG. 4 is a side cross sectional view illustrating the flexible grip shown in FIGS. 3A and 3B installed on the rotatable member shown in FIGS. 2A and 2B.

As shown in FIGS. 3A, 3B, and 4, flexible grip 54 snugly fits around outer peripheral surface 58 of rotatable member 50, and an outer peripheral surface 96 of grip 54 includes a plurality of gripping projections 98 to further facilitate traction between the rider's hand and grip 54 (and hence) rotatable handgrip 16. The inner peripheral surface 100 of grip 54 includes a plurality of rotatable member engaging recesses 104 that are evenly spaced in the circumferential direction of inner peripheral surface 100. Each rotatable member engaging recess 104 is shaped for snugly fitting to a corresponding rib 70 so that grip 54 is nonrotatably secured to rotatable member 50. A plurality of recesses 108 disposed between spaced apart pairs of inner peripheral surface portions 109 likewise are evenly spaced along the inner peripheral surface of grip 54. Each recesses 108 cooperates with a corresponding valley floor 92 for forming a plurality of spaces 110 as shown in FIG. 4. Inner peripheral surface portions 109 are disposed adjacent to their corresponding ribs 70 and contact both the rib 70 and the adjacent valley floor 92 to snugly fit grip 54 to rotatable member 50.

Figure 5:
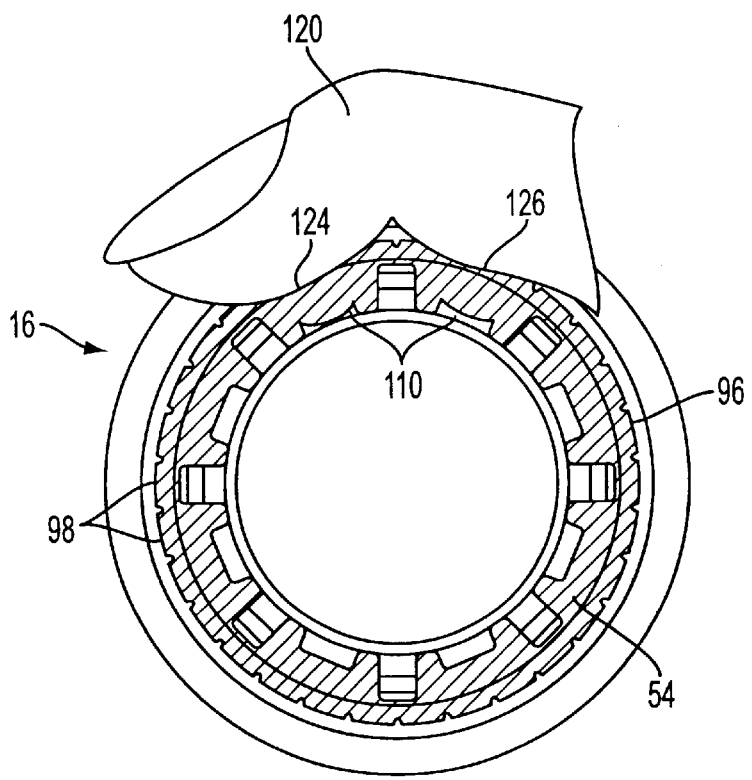
FIG. 5 is a side cross sectional view of the rotatable member and flexible grip illustrating how the flexible grip bends in response to a gripping force exerted by a hand.

FIG. 5 is a side cross sectional view of the rotatable member 50 and flexible grip 54 illustrating how the flexible grip 54 bends in response to a gripping force exerted by a hand. As shown in FIG. 5, a finger 120 presses radially inwardly to firmly grasp rotatable grip 16. Because of the flexibility of grip 54, the portions of grip 54 disposed over spaces 110 form first and second dents 124 and 126 which conform to finger 120 in response to the radially inwardly directed pressure of finger 120. When further pressure is applied by finger 120, the portions of grip 54 disposed over spaces 110 bend radially inwardly as shown in FIG. 5 for partially or substantially reducing the volume of the corresponding space 110. Because of this yielding nature of grip 54, dents 124 and 126 enhance the traction between the rider's hand and rotatable handgrip 16 by conforming more closely to the rider's hand. Also, there are no sharp edges jamming into the rider's hand as in the prior art rib/nub designs. Furthermore, the yielding nature of grip 54 also cushions the rider's hand to avoid the excessive pressures caused by prior art rib/nub designs, thus further reducing the risk of pain or fatigue.

Figure 6:
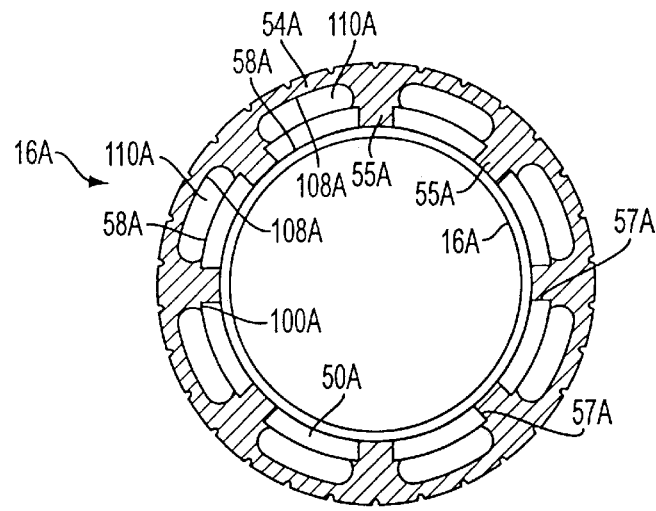
FIG. 6 is a side cross sectional view of an alternative embodiment of a rotatable member and flexible grip according to the present invention.

FIG. 6 is a side cross sectional view of an alternative embodiment of a rotatable handgrip 16A according to the present invention using a different rotatable member 50A and flexible grip 54A. In this embodiment, grip 54A includes a plurality of rotatable member engaging members 55A projecting radially inwardly from the inner peripheral surface 100A. Rotatable member 50A includes a plurality of grip engaging recesses 57A formed in outer peripheral surface 58A, wherein each rotatable member engaging member 55A is disposed in a corresponding grip engaging recess 57A. A plurality of recesses 108A disposed between adjacent pairs of rotatable member engaging members 55A are evenly spaced along the inner peripheral surface 100A of grip 54A. Each recess 108A cooperates with a corresponding portion of the outer peripheral surface 58A of rotatable member 50A for forming a plurality of spaces 110A that function in the same manner as spaces 110 in the first embodiment.

Figure 7:
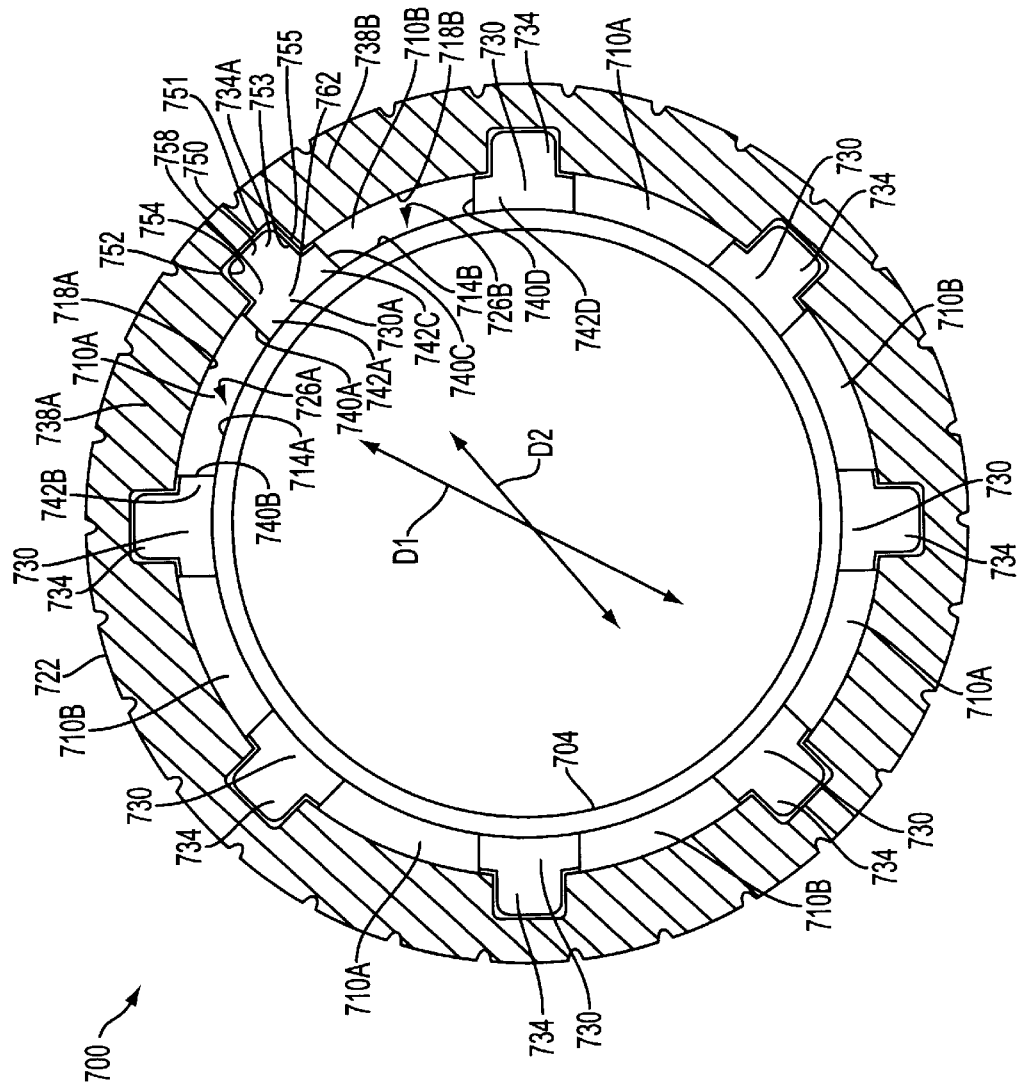
FIG. 7 is a side cross sectional view of another alternative embodiment of a rotatable member and flexible grip according to the present invention.

FIG. 7 is a side cross sectional view of an alternative embodiment of a rotatable handgrip 700 according to the present invention using a different rotatable member 704 and flexible grip 708. In this embodiment, a first space 710A is defined between an outer peripheral surface 714A of the rotatable member 704 and an inner peripheral surface 718A of the grip 708 so that the grip 708 bends radially inwardly into the first space 710A to form a first dent (not shown, but similar to dent 124 in FIG. 5) in the outer peripheral surface 722 of the grip in response to pressure from a hand part. A first space-forming recess 726A is formed on the outer peripheral surface 714A of the rotatable member 704 for forming the first space 710A. A second space 710B is defined between an outer peripheral surface 714B of the rotatable member 704 and an inner peripheral surface 718B of the grip 708 so that the grip 708 bends radially inwardly into the second space 710B to form a second dent (not shown, but similar to dent 126 in FIG. 5) in the outer peripheral surface 722 of the grip in response to pressure from the hand part. A second space-forming recess 726B is formed on the outer peripheral surface 714B of the rotatable member 704 for forming the second space 710B.

In general, rotatable member 704 includes a plurality of circumferentially evenly spaced grip engaging members or ribs 730 that engage a corresponding plurality of circumferentially evenly spaced rotatable member engaging recesses 734 to form a plurality of the first spaces 710A and second spaces 710B. For example, the rotatable member 704 includes a grip engaging member 730A projecting radially outwardly from the outer peripheral surfaces 714A and 714B, and the grip 708 includes a rotatable member engaging recess 734A formed between a first grip projection 738A projecting radially inwardly from the grip 708 and a second grip projection 738B projecting radially inwardly from the grip 708, wherein the grip engaging member 730A is disposed in the rotatable member engaging recess 734A.

The first space-forming recess 726A is formed between first and second rotatable member sidewalls 740A and 740B of first and second rotatable member projections 742A and 742B, respectively, extending radially outwardly from the outer peripheral surface 714A of the rotatable member 704, wherein the first and second rotatable member projections 742A and 742B terminate below the first grip projection 738A. The entire first space-forming recess 726A between the first and second rotatable member sidewalls 740A and 740B is disposed below the first grip projection 738A, and the entire outer peripheral surface 714A of the rotatable member 704 between the first rotatable member projection 742A and the second rotatable member projection 742B is spaced apart from the inner peripheral surface 718A of first grip projection 738A.

Similarly, the second space-forming recess 726B is formed between third and fourth rotatable member sidewalls 740C and 740D of third and fourth rotatable member projections 742C and 742D, respectively, extending radially outwardly from the outer peripheral surface 714B of rotatable member 704, wherein the third and fourth rotatable member projections 742C and 742D terminate below the second grip projection 738B. The entire second space-forming recess 726B between the third and fourth rotatable member sidewalls 740C and 740D is disposed below the second grip projection 738B, and the entire outer peripheral surface 714B of the rotatable member 704 between the third rotatable member projection 742C and the fourth rotatable member projection 742D is spaced apart from the inner peripheral surface 718B of second grip projection 738B.

In this embodiment, grip engaging member 730A includes a first section 750, a second section 758, and a third section 762. First section 750 includes a radially outermost surface 751 whose entire width contacts grip 708, a side surface 752 extending along and contacting a side wall 754 of the first grip projection 738A, and a side surface 753 extending along and contacting a side wall 755 of the second grip projection 738B. Second section 758 extends from the first section 750 and contacts the radially innermost surface 718A of the first grip projection 738A and the radially innermost surface 718B of the second grip projection 738B. Third section 762 extends radially inwardly from the second section 758 and forms the first rotatable member sidewall 740A and the third rotatable member sidewall 740C. A diameter D1 of an outer peripheral surface 722 of the grip 708 above a circumferential midpoint of the first space-forming recess 710A has a same value as a diameter D2 of the outer peripheral surface 722 of the grip 708 above a circumferential midpoint of the rotatable member engaging member 730A.

Figure 8:
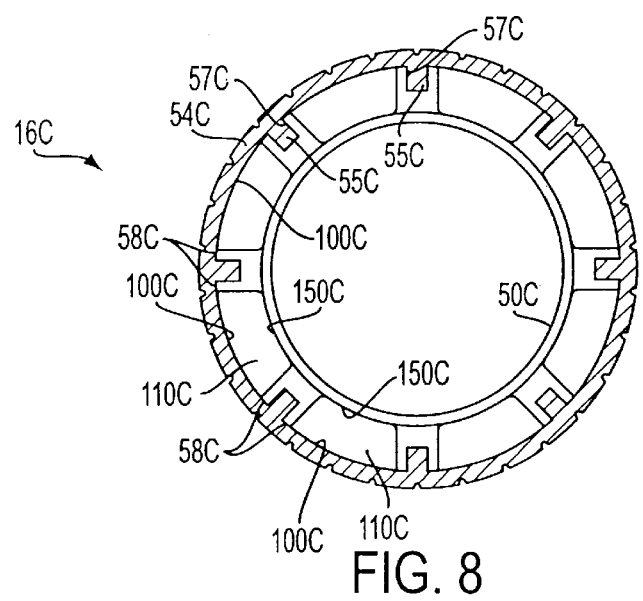
FIG. 8 is a side cross sectional view of another alternative embodiment of a rotatable member and flexible grip according to the present invention.

FIG. 8 is a side cross sectional view of another alternative embodiment of a rotatable handgrip 16C according to the present invention using a different rotatable member 50C and flexible grip 54C. In this embodiment, the grip 54C includes a plurality of rotatable member engaging members 55C projecting radially inwardly from the inner peripheral surface 100C, the rotatable member 50C includes a plurality of grip engaging recesses 57C formed in the outer peripheral surface 58C, and each rotatable member engaging member 55C is disposed in a corresponding grip engaging recess 57C. A plurality of evenly spaced recesses 150C are formed in the outer peripheral surface 58C of rotatable member SOC. Each recess 150C cooperates with the inner peripheral surface 100C of grip 54C for forming a plurality of spaces 110C that function in the same manner as spaces 110 in the first embodiment.

While the above is a description of various embodiments of the present invention, further modifications may be employed without departing from the spirit and scope of the present invention. For example, the size, orientation, location and shape of the various components may be changed as desired. Material may be added or removed from the parts as well. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A rotatable handgrip for a bicycle shifter comprising:
a rotatable member;
a flexible grip disposed over the rotatable member;
wherein a first space is defined between an inner peripheral surface of the grip and an outer peripheral surface of the rotatable member so that the grip bends radially inwardly into the first space to form a first dent in an outer peripheral surface of the grip in response to pressure from a hand part;
wherein a first space-forming recess is formed on the outer peripheral surface of the rotatable member for forming the first space;
wherein a second space is defined between an inner peripheral surface of the grip and an outer peripheral surface of the rotatable member so that the grip bends radially inwardly into the second space to form a second dent in the outer peripheral surface of the grip in response to pressure from the hand part;
wherein a second space-forming recess is formed on the outer peripheral surface of the rotatable member for forming the second space;
wherein the rotatable member includes a grip engaging member projecting radially outwardly from the outer peripheral surface;
wherein the grip includes a rotatable member engaging recess formed between a first grip projection projecting radially inwardly from the grip and a second grip projection projecting radially inwardly from the grip;
wherein the grip engaging member is disposed in the rotatable member engaging recess;
wherein the first space-forming recess is formed between first and second rotatable member projections extending radially outwardly from the outer peripheral surface of the rotatable member, wherein the first and second rotatable member projections terminate radially inwardly of the first grip projection;
wherein the first space-forming recess is disposed radially inwardly of the first grip projection; and
wherein the entire outer peripheral surface of the rotatable member between the first rotatable member projection and the second rotatable member projection is spaced apart from the inner peripheral surface of the grip.

2. The handgrip according to claim 1 wherein the second space-forming recess is formed between third and fourth rotatable member projections extending radially outwardly from the outer peripheral surface of the rotatable member, wherein the third and fourth rotatable member projections terminate radially inwardly of the second grip projection, wherein the second space-forming recess is disposed radially inwardly of the second grip projection, and wherein the entire outer peripheral surface of the rotatable member between the third rotatable member projection and the fourth rotatable member projection is spaced apart from the inner peripheral surface of the grip.

3. The handgrip according to claim 2 wherein the grip engaging member includes:
a first section extending along a side wall of the first grip projection and along a sidewall of the second grip projection;
a second section extending from the first section, along a radially innermost surface of the first grip projection, and along a radially innermost surface of the second grip projection; and
a third section extending radially inwardly from the second section.

4. The handgrip according to claim 3 wherein the first space-forming recess is formed by a first rotatable member sidewall facing a second rotatable member sidewall in a circumferential direction, and wherein the second space-forming recess is formed by a third rotatable member sidewall facing a fourth rotatable member sidewall in the circumferential direction.

5. The handgrip according to claim 4 wherein the third section of the grip engaging member forms the first rotatable member sidewall and the third rotatable member sidewall.

6. The handgrip according to claim 5 wherein the first section of the grip engaging member contacts the side wall of the first grip projection and the side wall of the second grip projection.

7. The handgrip according to claim 6 wherein the second section of the grip engaging member contacts the radially innermost surface of the first grip projection and the radially innermost surface of the second grip projection.

8. The handgrip according to claim 4 wherein the entire first space-forming recess between the first rotatable member sidewall and the second rotatable member sidewall is disposed radially inwardly of the first grip projection, and wherein the entire second space-forming recess between the third rotatable member sidewall and the fourth rotatable member sidewall is disposed radially inwardly of the second grip projection.

9. The handgrip according to claim 2 wherein the rotatable member includes:
   a plurality of the first-space forming recesses;
   a plurality of the second space forming recesses; and
   a plurality of elongated ribs forming a plurality of the grip engaging members;
   wherein the grip includes a plurality of the rotatable member engaging recesses; and
   wherein each of the plurality of ribs is disposed in a corresponding one of the plurality of rotatable member engaging recesses.

10. The handgrip according to claim 9 wherein the plurality of ribs are disposed evenly in a circumferential direction along the outer peripheral surface of the rotatable member.

11. The handgrip according to claim 10 wherein the plurality of first-space forming recesses and the plurality of second space-forming recesses are disposed evenly in the circumferential direction along the outer peripheral surface of the rotatable member.

12. The handgrip according to claim 11 wherein only one of the plurality of first space-forming recesses or second space-forming recesses is disposed between each adjacent pair of the plurality of ribs.

13. The handgrip according to claim 1 wherein the grip engaging member includes:
   a first section extending along a side wall of the first grip projection;
   a second section extending from the first section and along a radially innermost surface of the first grip projection; and
   a third section extending radially inwardly from the second section.

14. The handgrip according to claim 13 wherein the first space-forming recess is formed by a first rotatable member sidewall facing a second rotatable member sidewall in a circumferential direction.

15. The handgrip according to claim 14 wherein the third section of the grip engaging member forms the first rotatable member sidewall.

16. The handgrip according to claim 15 wherein the first section of the grip engaging member contacts the side wall of the first grip projection.

17. The handgrip according to claim 16 wherein the second section of the grip engaging member contacts the radially innermost surface of the first grip projection.

18. The handgrip according to claim 14 wherein the entire first space-forming recess between the first rotatable member sidewall and the second rotatable member sidewall is disposed radially inwardly of the first grip projection.

19. The handgrip according to claim 1 wherein a diameter of an outer peripheral surface of the grip above the first space-forming recess has a same value as a diameter of the outer peripheral surface of the grip above the grip engaging member.

20. The handgrip according to claim 19 wherein a diameter of an outer peripheral surface of the grip above a circumferential midpoint of the first space-forming recess has a same value as a diameter of the outer peripheral surface of the grip above a circumferential midpoint of the grip engaging member.

21. A rotatable handgrip for a bicycle shifter comprising:
   a rotatable member;
   a flexible grip disposed over the rotatable member;
   wherein a first space is defined between an inner peripheral surface of the grip and an outer peripheral surface of the rotatable member so that the grip bends radially inwardly into the first space to form a first dent in an outer peripheral surface of the grip in response to pressure from a hand part;
   wherein a first space-forming recess is formed on the outer peripheral surface of the rotatable member for forming the first space;
   wherein the first space-forming recess is formed by a first rotatable member sidewall facing a second rotatable member sidewall in a circumferential direction;
   wherein a second space is defined between an inner peripheral surface of the grip and an outer peripheral surface of the rotatable member so that the grip bends radially inwardly into the second space to form a second dent in the outer peripheral surface of the grip in response to pressure from the hand part;
   wherein a second space-forming recess is formed on the outer peripheral surface of the rotatable member for forming the second space;
   wherein the rotatable member includes a grip engaging member projecting radially outwardly from the outer peripheral surface;
   wherein the grip includes a rotatable member engaging recess formed between a first grip projection projecting radially inwardly from the grip and a second grip projection projecting radially inwardly from the grip;
   wherein the grip engaging member is disposed in the rotatable member engaging recess; and
   wherein the entire first space-forming recess between the first rotatable member sidewall and the second rotatable member sidewall is disposed radially inwardly of the first grip projection.

22. The handgrip according to claim 21 wherein the second space-forming recess is formed by a third rotatable member sidewall facing a fourth rotatable member sidewall in the circumferential direction and wherein the entire second space-forming recess is disposed radially inwardly of the second grip projection.

23. The handgrip according to claim 22 wherein the grip engaging member includes:
   a first section extending along a side wall of the first grip projection and along a sidewall of the second grip projection;
   a second section extending from the first section, along a radially innermost surface of the first grip projection, and along a radially innermost surface of the second grip projection; and
   a third section extending radially inwardly from the second section.

24. The handgrip according to claim 23 wherein the third section of the grip engaging member forms the first rotatable member sidewall and the third rotatable member.

25. The handgrip according to claim 24 wherein the first section of the grip engaging member contacts the side wall of the first grip projection and the side wall of the second grip projection.

26. The handgrip according to claim 25 wherein the second section of the grip engaging member contacts the radially innermost surface of the first grip projection and the radially innermost surface of the second grip projection.

27. The handgrip according to claim 22 wherein the rotatable member includes:
   a plurality of the first-space forming recesses;
   a plurality of the second space forming recesses; and
   a plurality of elongated ribs forming a plurality of the grip engaging members;
   wherein the grip includes a plurality of the rotatable member engaging recesses; and
   wherein each of the plurality of ribs is disposed in a corresponding one of the plurality of rotatable member engaging recesses.

28. The handgrip according to claim 27 wherein the plurality of ribs are disposed evenly in a circumferential direction along the outer peripheral surface of the rotatable member.

29. The handgrip according to claim 28 wherein the plurality of first-space forming recesses and the plurality of second space-forming recesses are disposed evenly in the circumferential direction along the outer peripheral surface of the rotatable member.

30. The handgrip according to claim 29 wherein only one of the plurality of first space-forming recesses or second space-forming recesses is disposed between each adjacent pair of the plurality of ribs.

31. The handgrip according to claim 21 wherein the grip engaging member includes:
   a first section extending along a side wall of the first grip projection;
   a second section extending from the first section and along a radially innermost surface of the first grip projection; and
   a third section extending radially inwardly from the second section.

32. The handgrip according to claim 31 herein the third section of the grip engaging member forms the first rotatable member sidewall.

33. The handgrip according to claim 32 wherein the first section of the grip engaging member contacts the side wall of the first grip projection.

34. The handgrip according to claim 33 wherein the second section of the grip engaging member contacts the radially innermost surface of the first grip projection.

35. A rotatable handgrip for a bicycle shifter comprising:
   a rotatable member;
   a flexible grip disposed over the rotatable member;
   wherein a first space is defined between an inner peripheral surface of the grip and an outer peripheral surface of the rotatable member so that the grip bends radially inwardly into the first space to form a first dent in an outer peripheral surface of the grip in response to pressure from a hand part;
   wherein a first space-forming recess is formed on the outer peripheral surface of the rotatable member for forming the first space;
   wherein a second space is defined between an inner peripheral surface of the grip and an outer peripheral surface of the rotatable member so that the grip bends radially inwardly into the second space to form a second dent in the outer peripheral surface of the grip in response to pressure from the hand part;
   wherein a second space-forming recess is formed on the outer peripheral surface of the rotatable member for forming the second space;
   wherein the rotatable member includes a grip engaging member projecting radially outwardly from the outer peripheral surface;
   wherein the grip includes a rotatable member engaging recess formed between a first grip projection projecting radially inwardly from the grip and a second grip projection projecting radially inwardly from the grip;
   wherein the grip engaging member is disposed in the rotatable member engaging recess;
   wherein the entire first space-forming recess is disposed radially inwardly of the first grip projection; and
   wherein a diameter of an outer peripheral surface of the grip above the first space-forming recess has a same value as a diameter of the outer peripheral surface of the grip above the grip engaging member.

36. The handgrip according to claim 35 wherein a diameter of an outer peripheral surface of the grip above a circumferential midpoint of the first space-forming recess has a same value as a diameter of the outer peripheral surface of the grip above a circumferential midpoint of the grip engaging member.

37. A rotatable handgrip for a bicycle shifter comprising:
   a rotatable member;
   a flexible grip disposed over the rotatable member;
   wherein a first space is defined between an inner peripheral surface of the grip and an outer peripheral surface of the rotatable member so that the grip bends radially inwardly into the first space to form a first dent in an outer peripheral surface of the grip in response to pressure from a hand part;
   wherein a first space-forming recess is formed on the outer peripheral surface of the rotatable member for forming the first space;
   wherein a second space is defined between an inner peripheral surface of the grip and an outer peripheral surface of the rotatable member so that the grip bends radially inwardly into the second space to form a second dent in the outer peripheral surface of the grip in response to pressure from the hand part;
   wherein a second space-forming recess is formed on the outer peripheral surface of the rotatable member for forming the second space;
   wherein the rotatable member includes a grip engaging member projecting radially outwardly from the outer peripheral surface;
   wherein the grip includes a rotatable member engaging recess formed between a first grip projection projecting radially inwardly from the grip and a second grip projection projecting radially inwardly from the grip;
   wherein the grip engaging member is disposed in the rotatable member engaging recess;
   wherein the grip engaging member includes:
      a first section extending along a side wall of the first grip projection;
      a second section extending from the first section and along a radially innermost surface of the first grip projection; and
      a third section extending radially inwardly from the second section.

38. The handgrip according to claim 37 wherein the first space-forming recess is formed by a first rotatable member sidewall facing a second rotatable member sidewall in a circumferential direction.

39. The handgrip according to claim 38 wherein the third section of the grip engaging member forms the first rotatable member sidewall.

40. The handgrip according to claim 39 wherein the first section of the grip engaging member contacts the side wall of the first grip projection.

41. The handgrip according to claim 40 wherein the second section of the grip engaging member contacts the radially innermost surface of the first grip projection.

42. The handgrip according to claim 37 wherein the rotatable member includes:
a plurality of the first-space forming recesses;
a plurality of the second space forming recesses; and
a plurality of elongated ribs forming a plurality of the grip engaging members;
wherein the grip includes a plurality of the rotatable member engaging recesses; and
wherein each of the plurality of ribs is disposed in a corresponding one of the plurality of rotatable member engaging recesses.

43. The handgrip according to claim 42 wherein the plurality of ribs are disposed evenly in a circumferential direction along the outer peripheral surface of the rotatable member.

44. The handgrip according to claim 43 wherein the plurality of first-space forming circumferential direction along the outer peripheral surface of the rotatable member.

45. The handgrip according to claim 44 wherein only one of the plurality of first space-forming recesses or second space-forming recesses is disposed between each adjacent pair of the plurality of ribs.

46. The handgrip according to claim 37 wherein a diameter of an outer peripheral surface of the grip above the first space-forming recess has a same value as a diameter of the outer peripheral surface of the grip above the grip engaging member.

47. The handgrip according to claim 46 wherein a diameter of an outer peripheral surface of the grip above a circumferential midpoint of the first space-forming recess has a same value as a diameter of the outer peripheral surface of the grip above a circumferential midpoint of the grip engaging member.

48. A rotatable handgrip for a bicycle shifter comprising:
a rotatable member;
a flexible grip disposed over the rotatable member;
wherein a first space is defined between an inner peripheral surface of the grip and an outer peripheral surface of the rotatable member so that the grip bends radially inwardly into the first space to form a first dent in an outer peripheral surface of the grip in response to pressure from a hand part;
wherein a first space-forming recess is formed on the outer peripheral surface of the rotatable member for forming the first space;
wherein a second space is defined between an inner peripheral surface of the grip and an outer peripheral surface of the rotatable member so that the grip bends radially inwardly into the second space to form a second dent in the outer peripheral surface of the grip in response to pressure from the hand part;
wherein a second space-forming recess is formed on the outer peripheral surface of the rotatable member for forming the second space;
wherein the rotatable member includes a grip engaging member projecting radially outwardly from the outer peripheral surface;
wherein the grip includes a rotatable member engaging recess formed between a first grip projection projecting radially inwardly from the grip and a second grip projection projecting radially inwardly from the grip;
wherein the grip engaging member is disposed in the rotatable member engaging recess; and
wherein a diameter of an outer peripheral surface of the grip above the first space-forming recess has a same value as a diameter of the outer peripheral surface of the grip above the grip engaging member.

49. The handgrip according to claim 48 wherein the rotatable member includes:
a plurality of the first-space forming recesses;
a plurality of the second space forming recesses; and
a plurality of elongated ribs forming a plurality of the grip engaging members;
wherein the grip includes a plurality of the rotatable member engaging recesses; and
wherein each of the plurality of ribs is disposed in a corresponding one of the plurality of rotatable member engaging recesses.

50. The handgrip according to claim 49 wherein the plurality of ribs are disposed evenly in a circumferential direction along the outer peripheral surface of the rotatable member.

51. The handgrip according to claim 50 wherein the plurality of first-space forming recesses and the plurality of second space-forming recesses are disposed evenly in the circumferential direction along the outer peripheral surface of the rotatable member.

52. The handgrip according to claim 51 wherein only one of the plurality of first space-forming recesses or second space-forming recesses is disposed between each adjacent pair of the plurality of ribs.

53. The handgrip according to claim 48 wherein a diameter of an outer peripheral surface of the grip above a circumferential midpoint of the first space-forming recess has a same value as a diameter of the outer peripheral surface of the grip above a circumferential midpoint of the grip engaging member.

* * * * *